United States Patent [19]

Gray

[11] Patent Number: 4,969,682
[45] Date of Patent: Nov. 13, 1990

[54] SEAT ASSEMBLY WITH ROLLER SEAT BACK HINGE

[75] Inventor: Carl A. Gray, Romeo, Mich.

[73] Assignee: General Motors Corporation, Detroit, Mich.

[21] Appl. No.: 416,164

[22] Filed: Oct. 2, 1989

[51] Int. Cl.⁵ .............................................. B60N 2/02
[52] U.S. Cl. ..................................... 297/378; 297/379
[58] Field of Search ........................ 297/353, 378, 379

[56] References Cited

U.S. PATENT DOCUMENTS

| | | | |
|---|---|---|---|
| 206,875 | 8/1978 | Hambrook | 297/378 X |
| 1,791,765 | 2/1931 | Saunders et al. | 297/378 |
| 1,936,973 | 11/1933 | Switzer | 297/378 |
| 2,716,775 | 9/1955 | Kenimer | 297/378 X |
| 2,926,950 | 3/1960 | Hooverson | 297/378 |
| 2,927,818 | 3/1960 | Ferrara | 297/378 |
| 4,394,047 | 7/1983 | Brunelle | 297/378 X |
| 4,731,888 | 5/1988 | Bridges | 297/378 |

Primary Examiner—Peter A. Aschenbrenner
Attorney, Agent, or Firm—William A. Schuetz

[57] ABSTRACT

A seat assembly for an automotive vehicle comprises a seat cushion unit, a back rest unit and an arcuate guide and pivotable roller hinge arm arrangement which is rollably received in the arcuate guide and which is operable to initially guide the back rest unit upwardly and forwardly from its normal upright position to an intermediate position above the seat cushion unit when the back rest unit is moved forwardly and then allow the back rest unit to be pivoted forwardly to a folded position in which it overlies the seat cushion unit while remaining operatively connected with the arcuate guide whereby the back rest unit will have its back side substantially horizontally disposed when folded.

5 Claims, 3 Drawing Sheets

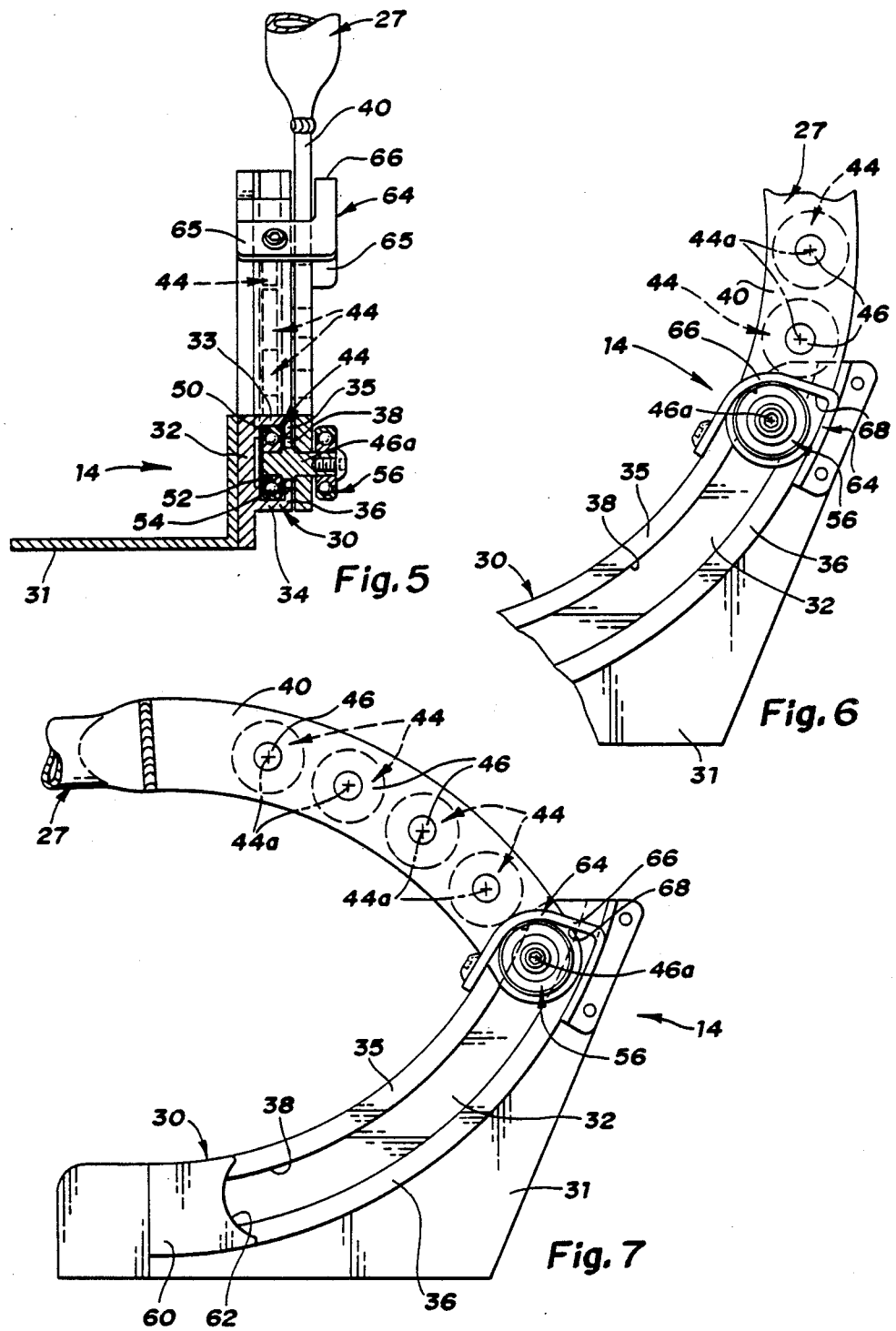

SEAT ASSEMBLY WITH ROLLER SEAT BACK HINGE

The present invention relates to a vehicle seat assembly and, more particularly, to a vehicle seat assembly having a seat cushion unit, a back rest unit and a novel arcuate guide and hinge arm arrangement which is operable to cause the seat back rest unit to be raised relative to the seat cushion unit prior to being folded over the seat cushion unit so that its backside will be horizontally disposed when folded over.

Heretofore, vehicle seat assemblies have been provided in which the seat back unit is connected to a seat cushion unit via a linkage arrangement including multiple pivotally interconnected links so that the seat back unit when folded forwardly over the seat cushion unit has its back sides substantially horizontally disposed. U.S. Pat. Nos. 2,926,950 and 2,927,818, which are assigned to the same assignee as the present invention, show such arrangements. While such arrangements are satisfactory in operation, they nevertheless require fairly complex linkage arrangements.

Also, U.S. Pat. Nos. 1,936,973 and 4,731,888, show seat assemblies in which a back rest unit can be folded rearwardly so as to be flush with the seat cushion unit to form a bed. U.S. Pat. No. 1,936,973 shows an L-shaped guide track and roller arrangement to guide the movement of the back rest unit between its upright and folded positions. U.S. Pat. No. 4,731,888 shows a scissors type linkage and slide arrangement. These arrangements, however, do not show or suggest forward tilting of the seat, much less forward tilting in which the seat back rest unit has its back side horizontally disposed to provide a cargo carrying horizontal surface In accordance with the provisions of the present invention, a novel seat assembly is provided which employs an arcuate guide and hinge arm arrangement for supporting a back rest unit in its normal upright position, but which enables the back rest unit to be readily moved upwardly and forwardly relative to the seat cushion unit and then pivoted forwardly to overlie the seat cushion unit so that its back side is horizontally disposed to provide a cargo carrying surface. The advantages of the novel seat assembly are that the arcuate guide and hinge arm arrangement are of a relatively simple and economical construction, it provides a stable support for the back rest unit when in its upright position, and it can be readily moved upwardly and forwardly of the seat cushion unit with a minimum of effort so that it will automatically pivot forwardly when raised due to its own weight.

Accordingly, a broad object of the present invention is to provide a new and improved seat assembly for an automotive vehicle, and in which the seat assembly includes a seat cushion unit, a back rest unit and an arcuate guide and hinge arm arrangement which is operable to initially guide the back rest unit upwardly and forwardly from its normal upright position to an intermediate position above the seat cushion unit when the back rest unit is moved forwardly and then allow the back rest unit to be pivoted forwardly to a folded position in which it overlies the seat cushion unit while remaining operatively connected with the arcuate guide whereby the back rest unit, when in its folded position, has its back side substantially horizontally disposed.

Another object of the present invention is to provide a new and improved seat assembly, as defined in the preceding object, and in which the arcuate guide and hinge arm arrangement comprises a stationary arcuate guide track carried by the seat cushion unit, and in which the hinge arm carries a plurality of rollers which are rollably received within the guide track so as to provide a stable support when the seat back rest unit is in its normal upright position, but which can be readily moved upwardly relative to the seat cushion unit due to the rolling engagement of the rollers in the arcuate guide track, and in which a lowermost roller on the hinge arm engages a stop means at the upper end of the guide track when the back rest unit is raised and forms a pivot to allow the seat back rest unit to move forwardly to a folded over position due to its own weight when in its raised position The present invention further resides in various novel constructions and arrangement of parts, and further objects, novel characteristics and advantages of the present invention will be apparent to those skilled in the art to which it relates and from the following detailed description of the illustrated, preferred embodiment thereof made with reference to the accompanying drawings forming a part of this specification and in which similar reference numerals are employed to designate corresponding parts throughout the several views, and in which:

FIG. 5 is a sectional view of part of the seat assembly of the present invention and taken along the direction of the arrows 5—5 of FIG. 4;

FIG. 6 is an enlarged fragmentary side elevational view of part of the seat assembly shown in FIG. 3 but showing different parts thereof in different positions; and FIG. 7 is an enlarged side elevational view of part of the seat assembly of the present invention and showing different parts thereof in different positions.

Figure 1:
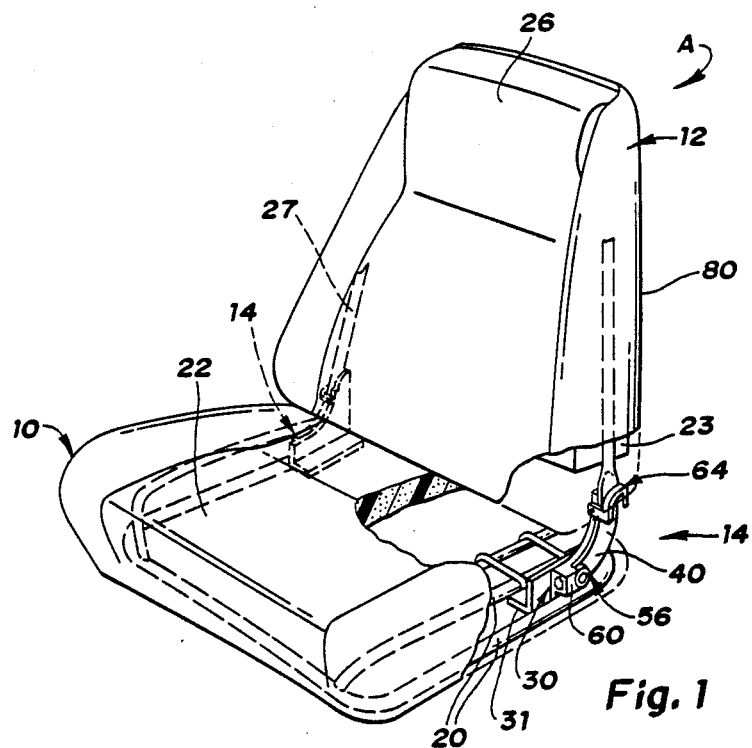
FIG. 1 is a perspective view, with portions broken away, of the novel seat assembly of the present invention.
Figure 3:
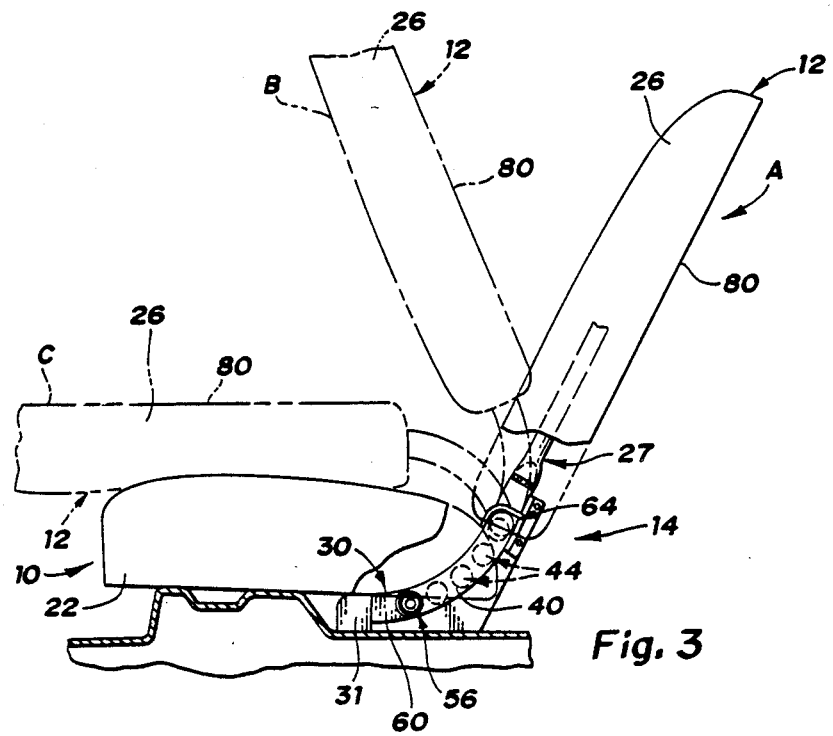
FIG. 3 is a side elevational view of the novel seat assembly of the present invention and showing the back rest unit thereof in different positions.

As best shown in FIGS. 1 and 3, the present invention provides a novel seat assembly A. The seat assembly A comprises, in general, a seat cushion unit 10, a back rest unit 12 and guide and pivotal roller hinge arm arrangements 14 for supporting and connecting the back rest unit 12 to the seat cushion unit 10.

The seat cushion 10 could be of any suitable or conventional construction and is generally shown in FIG. 1 as comprising a conventional seat frame 20 to which a suitable foam seat cushion 22 is mounted or secured. Likewise, the back rest unit 12 could be of any suitable or conventional construction and would include a suitable back rest frame 23 and a back rest cushion 26. The frame 23 of the back rest unit 12 carries a pair of hinge arms 27 which are suitably secured to the opposite sides of the back rest unit frame 23 and which depend downwardly therefrom.

The guide and pivotal roller hinge arm arrangements 14 at the left and right sides of the seat assembly A, as viewed in FIG. 1, are of an identical construction and hence, only the arrangement 14 at the right side of the seat assembly A will be described in detail. The arrangement 14 comprises a curved or arcuate guide track 30 which is welded or otherwise secured to a bracket 31, the bracket 31 being suitably welded or otherwise secured to the side of the seat frame 20 so that the curved guide track 30 is located outboard of the side of the seat frame 20. The curved guide track 30 extends from the side of the seat cushion 22 rearwardly and upwardly towards the adjacent side of the back rest unit 12.

Figure 2:
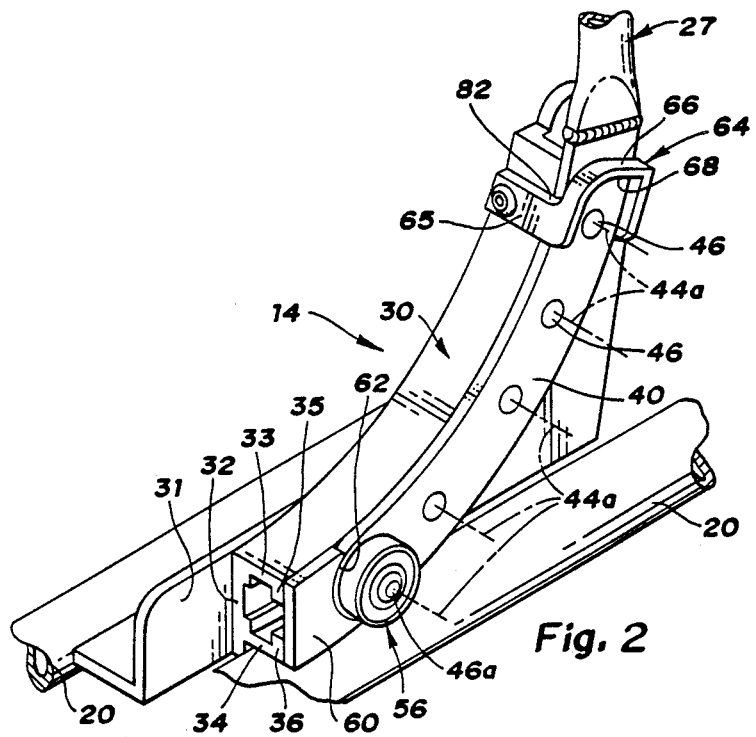
FIG. 2 is an enlarged fragmentary perspective view of part of the seat assembly shown in FIG. 1.
Figure 4:
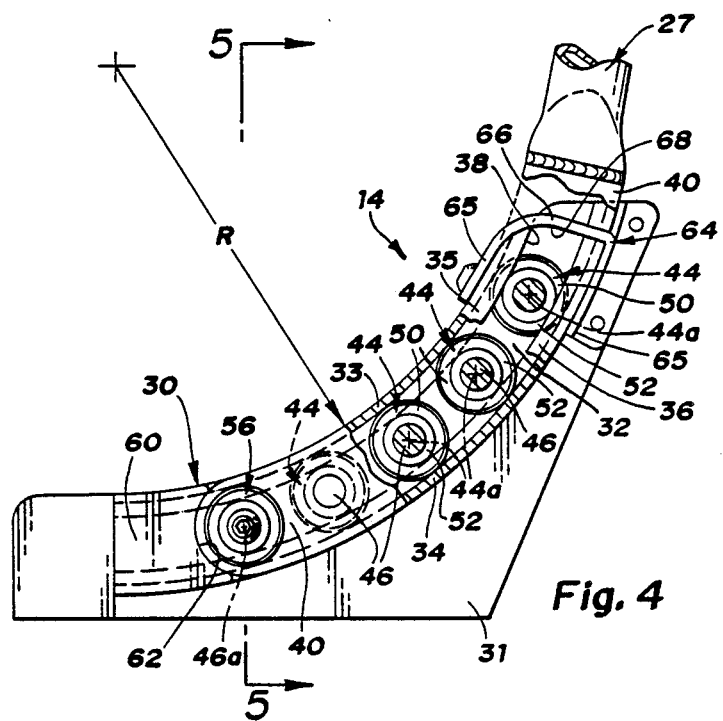
FIG. 4 is an enlarged fragmentary side elevational view of part of the seat assembly shown in FIG. 3.

The guide track 30 comprises a channel and is C-shaped in cross section, as best viewed in FIGS. 2 and 5. The guide track 30 has a left side 32, as viewed in FIG. 5, top and bottom sides 33, 34 and upper and lower flanges 35, 36 which face toward each other, but are spaced from each other to define an elongated arcuate slot 38 facing outwardly of the side of the seat cushion unit 10. The guide track 30 has a given radius of curvature R (see FIG. 4).

The hinge arm 27 has a curved lower end portion 40 whose radius of curvature is the same as the radius of curvature R for the guide track 30. The lower end portion 40 is planar and is located adjacent the arcuate slot 38. The lower end portion 40 carries a plurality of spaced rollers 44 adjacent its side facing the slot 38 and whose axes of rotation 44a extend perpendicular to the plane of the lower end portion 40. The rollers 44 are rollably received with the guide track 30 and are rotatably supported by stationary pivot pins or axles 46 secured to the lower end portions 40 of the hinge arm 27 and extending through the slot 38. The rollers 44 could be of any suitable or conventional construction and could be made of metal or plastic. The rollers 44 are hereshown as comprising an outer race 50, an inner race 52 which are separated by ball bearings 54. The inner race 52 would be secured to the pivot pin 46 and the outer race 50 would be freely rotatable relative thereto via the ball bearings 54.

The lower portion 40 of the hinge arm 27 also carries a movable roller 56 adjacent its side opposite the side adjacent to the rollers 44. The roller 56 would be of identical construction to the rollers 44 and would be aligned with the lowermost roller 44 carried by the lower portion 40 of the hinge arm 27. The roller 56 would be mounted on a common pivot pin 46a with the lowermost roller 44 so that its axis of rotation would be aligned with that of the lowermost roller 44.

The roller 56 functions as the movable stop connected with the hinge arm 27. When the back rest unit 12 is in its normal upright position, as shown by the solid lines in FIG. 3, the roller 56 engages a stationary stop 60 which is suitably welded or otherwise secured to the lower end of the arcuate guide track 30. The stop 60 comprises a plate which is secured over the slot 38 at the lower end of the guide track 30 and has a curved surface 62 facing toward the roller 56. The roller 56 engages the surface 62 to provide a stop to prevent back rest unit 12 from being pivoted any further in a clockwise direction, as viewed in FIG. 3, when the latter is in its normal upright position, as shown by the solid lines in FIG. 3. The guide track 30 at its upper end also carries a second stationary stop 64. The stop 64 is in the form of a yoke whose side legs 65 straddle the curved guide track 30 and the lower end 40 of the hinge arm 27 and is either welded or otherwise secured to the upper end of the guide track 30 so as to be stationary. The stop 64 has an intermediate upwardly extending bight portion 66 which defines a curved recess or inner surface 68 for engaging the roller 56 when the back rest unit 12 is raised to an intermediate position, as shown by the phantom line position B in FIG. 3.

The operation of the novel seat assembly A will now be described. When the back rest unit 12 is in its normal upright position, as shown in FIG. 1 or shown by the solid lines in FIG. 3, all of the rollers 44 are received within the guide track 30 and the roller 56 engages the stop surface 62. This engagement between the roller 56 and the stop surface 62 on the guide track 30 positions the seat back rest unit in its normal upright position.

When the operator desires to move the back rest unit 12 from its normal upright position to a folded position, as shown by the phantom line position C in FIG. 3, he need merely lift up or tilt forward the back rest unit 12. This will cause the rollers 44 to roll on the bottom surface 34 of the guide track 30 to allow the lower end portions 40 of the hinge arms 27 to move upwardly relative to the guide track 30. This upward movement causes the seat back rest unit 12 to move both upwardly and forwardly relative to the seat cushion unit 10. When the back rest unit 12 has been moved to the phantom line position B in FIG. 3, it will be located in an intermediate position in which all but the lowest roller 44 carried by the lower end portion 40 of the hinge arm 27 will be located above the guide track and the roller 56 will engage the bight 66 of the stop 64. When in this position, the back rest unit 12 can pivot about the lowest roller 44 and the roller 56 and the back rest unit can be moved to its folded position, as shown by the phantom line position C in FIG. 3, in which it overlies the seat cushion unit 10. Note that when the back rest unit 12 is in its intermediate position, as shown by the phantom line position B in FIG. 3, it will fall and pivot by its own weight about the axis of the roller 56 and the lowermost roller 44 and move automatically to its folded position Note that the lower end portion 40 of the hinge arm 27 engages a surface 82 (see FIG. 2) at the topmost edge of the front, side leg 65 of the stop 64 when the back rest unit 12 is folded to the position C in FIG. 3 to insure that the back side 80 thereof will be horizontally disposed.

Since most automotive seat cushion units and back rest units are contoured or arcuate and not planar, it is not possible to fold such back rest units about a single pivot axis so that when folded over the seat cushion unit its back side will be horizontally disposed relative to the seat. However, in accordance with the novel guide and pivotal roller hinge arm arrangement described above, the back rest unit 12 is caused to be moved upwardly relative to the seat cushion unit 10 and then pivoted forwardly whereby its back side 80 will be horizontally disposed over the seat cushion unit 10 to form a cargo carrying platform or area.

When the operator desires to return the seat back unit 12 to its normal upright position, he need merely tilt the back rest unit 12 from its folded position, as shown by the phantom line position C in FIG. 3, back towards its intermediate position, as shown by the phantom line position B, whereupon the rollers 44 will be disposed in line with the guide track 30 and the back rest unit will automatically move due to gravity back to its normal upright position with the rollers 44 rolling within the guide track 30.

From the foregoing, it should be apparent that a novel seat assembly has been provided in which a back rest unit can be moved to a folded position in which its back side is horizontally disposed. In addition, it should be noted that the provision of the arcuate guide track and rollers enables the back rest to be readily moved from its normal upright position to its folded over position with a minimal amount of effort due to the minimal amount of friction between the rollers and the guide track. In addition, by employing a plurality of rollers, the back rest unit 12 is adequately supported within its normal upright position and thus no interlock or lock means to secure it in its upright position is required.

It should also be noted that instead of a plurality of rollers 44, only the lowermost rollers 44, 56 along with a plastic arcuate guide secured to the hinge arm need be employed if some of the rollers were to be omitted.

In addition, a suitable weighted inertia latch (not shown) pivotally supported by the bracket 31 and receivable through an opening (not shown) in the bottom 34 of the guide track 30 could be provided so that, in case of a sudden rapid deceleration of the vehicle, the inertia latch would pivot and be disposed between two adjacent rollers 44 on the hinge arm 40 to prevent the seat back 12 from moving upwardly and forwardly.

Although the illustrated embodiment thereof has been described in great detail, it should be apparent that certain modifications, changes and adaptations may be made in the illustrated embodiment, and that it is intended to cover all such modifications, changes and adaptations which come within the spirit of the present invention.

What is claimed is:

1. In a seat assembly for an automotive vehicle, said seat assembly having a seat cushion unit, a back rest unit, and means for connecting the back rest unit to the seat cushion unit so that the back rest unit can be moved from its normal upright position to a folded position over the seat cushion and so that its back side is substantially horizontally disposed, the improvement being that said last named means comprises:

an arcuate guide and hinge arm arrangement comprising an arcuate guide track carried by the seat cushion unit, a hinge arm rigidly secured to said back rest unit and means for guidably connecting said hinge arm and back rest unit for movement in unison relative to said guide track, said arcuate guide and hinge arm arrangement being operable to initially guide the back rest unit and hinge arm upwardly and forwardly from its normal upright position to an intermediate position above the seat cushion unit when the back rest unit is moved forwardly and then allow the back rest unit and hinge arm to be pivoted forwardly in unison to a folded position in which it overlies the seat cushion unit while remaining operatively connected with said arcuate guide whereby said back rest unit, when in its folded position, has its back side substantially horizontally disposed.

2. A vehicle seat assembly comprising a seat unit including a seat frame and a seat cushion, a back rest unit including a back rest cushion and a hinge arm at its side, and a support and hinge means carried by said seat frame and operatively connected with a lower end portion of said side hinge arm for supporting said back rest unit in a normal upright position and for allowing said back rest unit to be folded forwardly over the seat cushion unit, the improvement being that said support and hinge means comprises an arcuate guide track open at one side and which is secured to said seat frame, a stationary stop means carried by said guide track adjacent its upper end, guide means comprising a plurality of spaced guide members carried by said lower end portion of said arm and which are guidably received within said guide track, a movable stop means carried by said side arm adjacent its lower end, said guide member closest to the lower end of said arm being substantially laterally aligned with said movable stop means, said back rest unit being movable from its normal upright position upwardly and forwardly along said guide track to a first raised intermediate position in which all of the guide members except for the guide member closest to the lower end of said arm are disposed above said guide track and in which the movable stop means engages the stationary stop means and then to a folded over position about the said laterally aligned guide member and movable stop means whereby said back rest unit when folded over will have its back side substantially horizontally disposed.

3. A vehicle seat assembly comprising a seat unit including a seat frame and a seat cushion, a back rest unit having a pair of side arms and a support means carried by said seat frame and operatively connected with said side arms of said back rest unit for supporting the back rest unit in an upright position and for enabling the back rest unit to be folded forwardly over the seat cushion unit, the improvement being that said support means comprises a pair of arcuate tracks open on one side and which are secured to opposite sides of said seat frame, said side arms have lower end portions which are arcuate, a plurality of spaced roller means carried by said lower end portions of said arms and rollably received in said tracks, said back rest unit being movable from its normal upright position in which said lower end portions of said arms engage a lower stop carried by said guide tracks upwardly and forwardly along said tracks to an intermediate position in which all but the roller means closest to the lower end of said arms is located above said tracks and in which stops carried by said arms on its side facing away from said tracks engage stops adjacent the upper end of said tracks, said arms and back rest unit then being pivotal forwardly about the roller means remaining in the track whereby said back rest unit when folded will have its back side substantially horizontally disposed.

4. A seat assembly, as defined in claim 3, and wherein said stops carried by said arms comprise rotatable roller means axially aligned with the roller means closest to the lower end of said arms.

5. A seat assembly, as defined in claim 4, and wherein said stops adjacent the upper ends of said tracks straddles the lower end portion of said arms.

* * * * *